(12) United States Patent
Garbe

(10) Patent No.: US 8,655,566 B2
(45) Date of Patent: Feb. 18, 2014

(54) BRAKE DEVICE AND BRAKING METHOD FOR A MOTOR VEHICLE

(75) Inventor: Thomas Garbe, Affalterbach (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/423,699

(22) Filed: Mar. 19, 2012

(65) Prior Publication Data

US 2012/0310502 A1 Dec. 6, 2012

(30) Foreign Application Priority Data

Mar. 17, 2011 (DE) .......... 10 2011 001 365

(51) Int. Cl.
*G06F 7/70* (2006.01)
(52) U.S. Cl.
USPC .......................................................... 701/70
(58) Field of Classification Search
None
See application file for complete search history.

(56) References Cited

U.S. PATENT DOCUMENTS

| 6,398,319 | B1 | 6/2002 | Wilson et al. |
| 6,981,019 | B1* | 12/2005 | Boies et al. ................ 709/204 |
| 8,165,747 | B2 | 4/2012 | Ueno et al. |
| 2011/0153043 | A1* | 6/2011 | Ojala ............................. 700/94 |
| 2012/0069131 | A1* | 3/2012 | Abelow ...................... 348/14.01 |
| 2012/0123655 | A1* | 5/2012 | Kurata ........................... 701/70 |

FOREIGN PATENT DOCUMENTS

| DE | 198 32 036 | 1/1999 |
| EP | 1 016 574 | 7/2000 |
| EP | 1 138 564 | 10/2001 |
| EP | 1 707 460 | 10/2006 |
| GB | 2 419 164 | 4/2006 |
| JP | 10-203350 | 8/1998 |

* cited by examiner

*Primary Examiner* — Thomas Tarcza
*Assistant Examiner* — Adam Alharbi
(74) *Attorney, Agent, or Firm* — Gerald E. Hespos; Michael J. Porco; Matthew T. Hespos

(57) ABSTRACT

A brake device for a motor vehicle has a brake pedal device (12) that can be operated by a driver with a variable force/travel pedal characteristic curve (V-PKL), a brake apparatus (20) for braking the motor vehicle with a braking effect corresponding to a degree of activation of the brake pedal device (12) and corresponding to the varible force/travel pedal characteristic curve (V-PKL), a memory device (16) with a stored characteristic diagram (KFL) of possible force/travel pedal characteristic curves and with a control device (14) for selecting the variable force/travel pedal characteristic curve (V-PKL) from the characteristic diagram (KFL) of the possible force/travel pedal characteristic curves.

17 Claims, 3 Drawing Sheets

BRAKE DEVICE AND BRAKING METHOD FOR A MOTOR VEHICLE

CROSS REFERENCE TO RELATED APPLICATION

This application claims priority under 35 USC 119 to German Patent Appl. No. 10 2011 001 365.2 filed on Mar. 17, 2011, the entire disclosure of which is incorporated herein by reference.

BACKGROUND OF THE INVENTION

1. Field of the Invention

The invention relates to a brake device and to a braking method for a motor vehicle.

2. Description of the Related Art

In hydraulic brake devices, it is generally known that the force/travel characteristic curve is influenced by the geometric dimensions of the brake device. External influences, such as, wet brake disks, changes to the brake linings, trailer mode and fading also influence the vehicle deceleration that can be brought about by the pedal activation. In brake systems with a pedal simulator, a force/travel characteristic curve is generated electronically by a control unit. In this context, a failure to couple frequently occurs under the external influences mentioned above.

EP 1 138 564 A2 describes an electromechanical vehicle brake system with electronic transmission of a braking process, triggered by a brake pedal, to a brake on the vehicle wheel. This brake system has a slip control function when wheel slip occurs and brings about activation of the brakes that differs from the activation of the brake pedal. A reaction behavior can be generated when such a slip control function is activated at the brake pedal such as is otherwise customary in a hydraulic vehicle brake system.

In the described electromechanical vehicle brake system, this reaction behavior can be generated in what is referred to as a pedal simulator, namely a vibrator or a piezo-element. In this context, the generation of the reaction behavior optionally can be prevented and the reaction behavior that corresponds to an active slip control function in a hydraulic brake system can be amplified or attenuated in comparison to the latter.

The object of the invention is to provide a brake device and a braking method for a motor vehicle that give the driver a natural brake pedal sensation and permit coupling between the force/travel characteristic curve of the brake device and prevailing ambient influences.

SUMMARY OF THE INVENTION

The invention relates to a brake device and a braking method for a motor vehicle. The brake device has a brake pedal device that can be operated by a driver with a variable force/travel pedal characteristic curve. The break device also has a brake apparatus for braking the motor vehicle with a braking effect corresponding to a degree of activation of the brake pedal device and corresponding to the variable force/travel pedal characteristic curve.

The brake device also has a memory device with a stored characteristic diagram of possible force/travel pedal characteristic curves and a control device for selecting the variable force/travel pedal characteristic curve from the characteristic diagram of the possible force/travel pedal characteristic curves.

The braking method of the invention includes limiting a characteristic diagram stored in a memory device of a brake device of possible force/travel pedal characteristic curves of a brake pedal device. The method then includes using a control device for selecting a variable force/travel pedal characteristic curve from the characteristic diagram of the possible force/travel pedal characteristic curves. The method further brakes the motor vehicle with a braking effect corresponding to a degree of activation of the brake pedal device and corresponding to the variable force/travel pedal characteristic curve.

The invention is an adaptation of the force/travel pedal characteristic curve of the brake pedal device so that, on one hand, an actual force/travel pedal characteristic curve corresponding to the current braking behavior of the device allows the driver to sense ambient influences and, on the other hand, an intrinsic force/travel pedal characteristic curve is used to calibrate the brake pedal device.

A variable setting of the control device may be provided and the characteristic diagram of the possible force/travel pedal characteristic curves can be run through gradually by means of the variable setting. The variable setting enables the variable force/travel pedal characteristic curve to be selected from a multiplicity of possible force/travel pedal characteristic curves and used as a force/travel pedal characteristic curve of the brake pedal device.

The characteristic diagram of possible force/travel pedal characteristic curves may be limited by an intrinsic force/travel pedal characteristic curve with which the brake pedal device is calibrated, and by an actual force/travel pedal characteristic curve which corresponds to a current braking behavior of the brake apparatus.

The brake apparatus may have a sensor unit for sensing the actual force/travel pedal characteristic curve and a brake system for generating the braking effect.

The actual force/travel pedal characteristic curve may be varied by changes to the brake system.

The actual force/travel pedal characteristic curve may be varied after multiple braking or relatively long braking with the brake system.

The intrinsic force/travel pedal characteristic curve may have a proportional force/travel dependence.

The control device can vary the variable force/travel pedal characteristic curve in the driving mode of the motor vehicle so that the setting of the force/travel pedal characteristic curve can be carried out easily in the driving mode.

The braking method may change the actual force/travel pedal characteristic curve by changes at the brake apparatus.

The braking method also may include changing the variable setting in the driving mode of the motor vehicle.

The braking method further may use a variable setting of the control device for gradually running through the characteristic diagram of the possible force/travel pedal characteristic curves.

The above-described refinements and developments of the invention can be combined with one another in any desired suitable way.

DETAILED DESCRIPTION OF THE PREFERRED EMBODIMENTS

Figure 1:
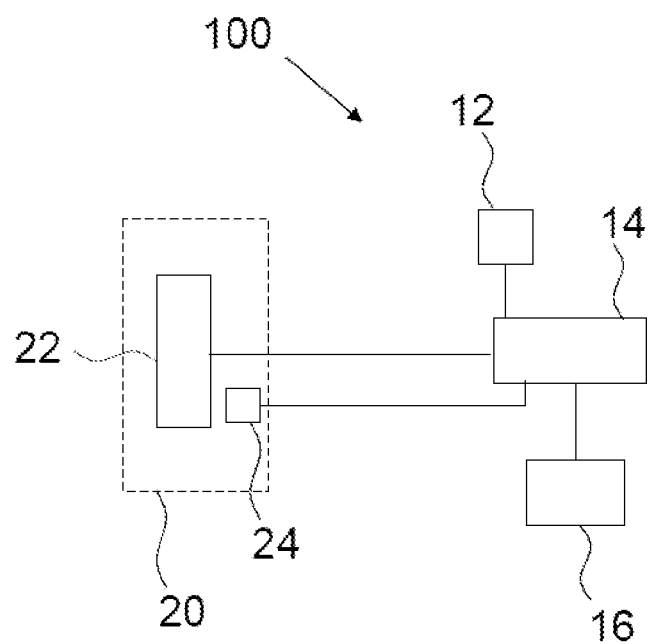
FIG. 1 is a schematic illustration of a brake device according to an embodiment of the present invention.

FIG. 1 is a schematic illustration of a brake device 100 according to an embodiment of the invention. The brake device 100 comprises a brake pedal device 12, a control device 14, a memory device 16 and a brake apparatus 20.

The control device 14 is connected to the brake pedal device 12, the memory device 16 and the brake apparatus 20 and is operative to select a desired variable force/travel pedal characteristic curve V-PKL from a characteristic diagram KFL, stored in the memory device 16, of possible force/travel pedal characteristic curves. The selection is made in accordance with the driving state of the motor vehicle or on the basis of a variable setting AE, which can be set by the driver.

The brake apparatus 20 has a brake system 22 and a sensor unit 24 with force sensors and/or acceleration sensors for measuring the braking deceleration and the braking behavior of the motor vehicle.

Sensors for sensing the brake disk temperature also may be used as a sensor unit 24 to measure the braking deceleration and the braking behavior of the motor vehicle.

The brake system 22 may, for example, a hydraulic brake system and/or as a recuperative brake system.

Figure 2:
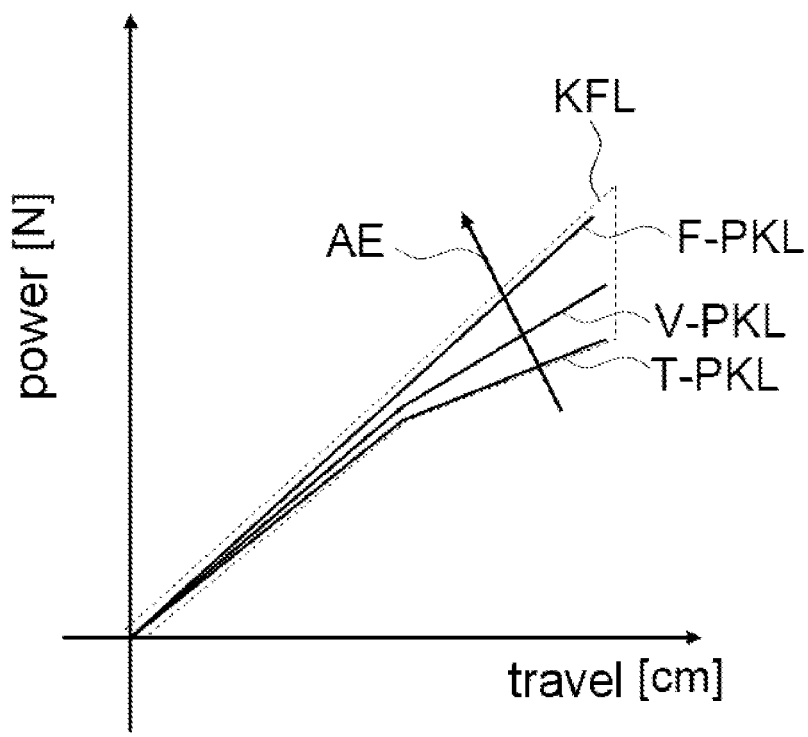
FIG. 2 is a diagram illustrating a characteristic diagram of possible force/travel pedal characteristic curves according to an embodiment of the invention.

FIG. 2 is a characteristic diagram of possible force/travel pedal characteristic curves where a force that causes the braking deceleration is plotted against the pedal travel of the brake pedal device 12.

An increase in the force as the pedal travel increases is marked. Such a force/travel pedal characteristic curve is very advantageous for the brake device 100 since it permits very expedient operability of the brake device 100. As a result of the activation of the brake pedal device 12, for example a proportional vehicle deceleration occurs, wherein the driver becomes accustomed to this basic assignment of activation and deceleration.

A characteristic diagram KFL of possible force/travel pedal characteristic curves is limited by an actual force/travel pedal characteristic curve T-PKL corresponding to the current braking behavior of the brake apparatus 20 and by an intrinsic force/travel pedal characteristic curve F-PKL. The intrinsic force/travel pedal characteristic curve F-PKL constitutes that force/travel pedal characteristic curve with which the brake pedal device 12 is calibrated.

The actual force/travel pedal characteristic curve T-PKL has specific characteristics in the form of abrupt changes in the gradient or other properties caused by external influences, such as wet brake disks and linings, trailer mode, fading etc.

The difference between the actual force/travel pedal characteristic curve T-PKL and the intrinsic force/travel pedal characteristic curve F-PKL is perceived by the driver in a sensitive way as a change to the brake system. This difference continuously informs the driver about the state of the brakes and about the ambient influences.

A variable force/travel pedal characteristic curve V-PKL now is selected from the multiplicity of possible force/travel pedal characteristic curves through a variable setting AE, for example variable from 0 to 100%, and is used as a variable force/travel pedal characteristic curve V-PKL of the brake pedal device 12.

Given a value of 100% for the variable setting AE, the braking behavior of the vehicle does not differ from the braking behavior of a vehicle with a conventional brake system, and the actual force/travel pedal characteristic curve T-PKL is used in accordance with the current braking behavior of the brake apparatus 20.

Given a value of 0% for the variable setting AE, there is no feedback whatsoever from the brake system and the intrinsic force/travel pedal characteristic curve of the brake pedal device 20 with which the brake pedal device 12 is calibrated is used.

By means of the variable setting AE it is possible to display, for example, any desired comfort features of the brake device 100 of the motor vehicle with the exact same hardware. It is possible to switch over between different comfort features during the driving mode. The driver can also vary the variable setting AE manually.

The control device 14 also can vary the variable setting AE as a function, for example, of an operational performance provided by the motor vehicle. The operational performance can be determined here according to the service life of the motor vehicle or according to the kilometer reading of the motor vehicle.

For example, the control device 14 can also sense the service life of the brake apparatus 20 or of the brake system 22 by means of further sensors and can adapt the variable setting AE to communicate a current braking effect of the brake apparatus 20 to the driver.

Figure 3:
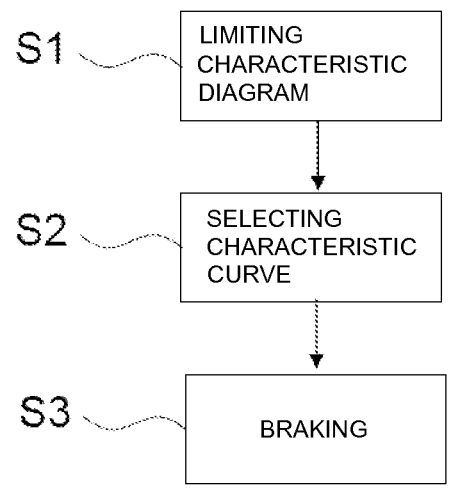
FIG. 3 is a flowchart of the braking method of the invention.

FIG. 3 is a flowchart of an embodiment of the braking method for a motor vehicle in accordance with the invention. The braking method includes limiting a characteristic diagram KFL of the possible force/travel pedal characteristic curves of a brake pedal device 12 stored in the memory device 16 of a brake device 100 (step S1). The braking method continues by using the control device for selecting a variable force/travel pedal characteristic curve V-PKL from the characteristic diagram KFL of the possible force/travel pedal characteristic curves (step S2). The method proceeds by braking the motor vehicle with a braking effect corresponding to a degree of activation of the brake pedal device 12 and corresponding to the variable force/travel pedal characteristic curve V-PKL (step S3). The method can be executed by the brake device 100 of FIG. 1.

Even though the invention has been described above on the basis of the exemplary embodiments, it is not limited thereto and can be modified in a variety of ways.

What is claimed is:

1. A brake device for a motor vehicle having:
   a brake pedal device that can be operated by a driver with a variable force/travel pedal characteristic curve;
   a brake apparatus for braking the motor vehicle with a braking effect corresponding to a degree of activation of the brake pedal device and corresponding to the variable force/travel pedal characteristic curve;
   a memory device with a stored characteristic diagram of possible force/travel pedal characteristic curves; and
   a control device for selecting the variable force/travel pedal characteristic curve from the characteristic diagram of the possible force/travel pedal characteristic curves based upon at least one external influence selected from wet brake disks, wet brake linings, trailer mode and fading.

2. The brake device of claim 1, wherein a variable setting of the control device is provided and the characteristic diagram of the possible force/travel pedal characteristic curves can be run through gradually by means of the variable setting.

3. The brake device of claim 1, wherein the characteristic diagram of possible force/travel pedal characteristic curves is limited by an intrinsic force/travel pedal characteristic curve with which the brake pedal device is calibrated, and by an actual force/travel pedal characteristic curve that corresponds to a current braking behavior of the brake apparatus.

4. The brake device of claim 3, wherein the brake apparatus has a sensor unit for sensing the actual force/travel pedal characteristic curve and a brake system for generating the braking effect.

5. The brake device of claim 4, wherein the actual force/travel pedal characteristic curve can be varied by changes to the brake system.

6. The brake device of claim 4, wherein the actual force/travel pedal characteristic curve can be varied after multiple braking or relatively long braking with the brake system.

7. The brake device of claim 4, wherein the intrinsic force/travel pedal characteristic curve has a proportional force/travel dependence.

8. The brake device of claim 1, wherein the variable force/travel pedal characteristic curve can be varied by the control device in a driving mode of the motor vehicle.

9. A braking method for a motor vehicle comprising:
storinq a plurality of possible force/travel pedal characteristic curves of a brake pedal device in a memory of a brake device;
determining whether at least one external influence on braking is present, the external influence being selected from wet brake disks, wet brake linings, trailer mode and fading;
selecting a variable force/travel pedal characteristic curve from the characteristic diagram of the possible force/travel pedal characteristic curves based upon the presence or absence of the external influence on braking; and
braking the motor vehicle with a braking effect corresponding to a degree of activation of the brake pedal device and corresponding to the selected variable force/travel pedal characteristic curve.

10. The braking method of claim 9, further comprising varying an actual force/travel pedal characteristic curve based on changes to the brake apparatus.

11. The braking method of claim 9, further comprising changing a variable setting in the driving mode of the motor vehicle.

12. The braking method of claim 9, further comprising using a variable setting of the control device for gradually running through the characteristic diagram of the possible force/travel pedal characteristic curves.

13. The braking method of claim 9, further comprising manually inputting a driver selection for varying the variable force/travel pedal characteristic curve based on a driver preference.

14. The braking method of claim 9, further comprising measuring braking deceleration and at least one braking behavior characteristic of the brake device, determining at least one factor indicative of a service life of the motor vehicle and selecting the variable force/travel pedal characteristic curve from the characteristic diagram of the possible force/travel pedal characteristic curves based upon the braking deceleration and the braking behavior characteristic measured by the sensor unit and based on at least one factor indicative of a service life of the motor vehicle.

15. The braking method of claim 14, wherein the step of measuring braking deceleration and at least one braking behavior characteristic of the brake device comprises measuring brake disk temperature.

16. The braking method of claim 14 worrying the step of determining at least one factor indicative of a service life of the motor vehicle comprises determining mileage of the vehicle.

17. The brake device of claim 1, further comprising a sensor unit for measuring braking deceleration and at least one braking behavior characteristic of the brake apparatus, and wherein the control device selects the variable force/travel pedal characteristic curve from the characteristic diagram of the possible force/travel pedal characteristic curves based upon the braking deceleration and the braking behavior characteristic measured by the sensor unit and based on at least one factor indicative of a service life of the motor vehicle.

* * * * *